United States Patent [19]
Belcher

[11] 3,870,580
[45] Mar. 11, 1975

[54] METHOD OF MANUFACTURING OF A FIBER REINFORCED STRUCTURE AND METHOD OF MANUFACTURE

[76] Inventor: Jack T. Belcher, 1100 E. Sahara Ave., Las Vegas, Nev. 89105

[22] Filed: May 4, 1973

[21] Appl. No.: 357,448

Related U.S. Application Data

[62] Division of Ser. No. 118,708, Feb. 25, 1971, abandoned.

[52] U.S. Cl.............. 156/181, 156/242, 156/296, 264/241, 264/257, 264/261, 264/271
[51] Int. Cl............................................ B29h 9/04
[58] Field of Search ........... 156/148, 161, 166, 172, 156/180, 296, 433, 441, 181, 242; 161/88–96, 98, 140, 142–144, 170; 264/103, 167, 174, 134–137, 108, 241, 257, 261, 271

[56] References Cited
UNITED STATES PATENTS

| | | | |
|---|---|---|---|
| 2,692,219 | 10/1954 | Slayter et al........................ | 156/166 |
| 3,328,218 | 6/1967 | Noyes.................................. | 156/166 |
| 3,436,038 | 4/1969 | Parsons et al...................... | 244/123 |
| 3,514,830 | 6/1970 | Takakita et al..................... | 156/242 |
| 3,579,411 | 5/1971 | Mackie et al. ..................... | 161/53 |
| 3,657,040 | 4/1972 | Shobert............................... | 156/242 |
| 3,764,452 | 10/1973 | Marzochi............................ | 156/242 |

Primary Examiner—Douglas J. Drummond
Assistant Examiner—F. Frisenda, Jr.
Attorney, Agent, or Firm—Lyon and Lyon

[57] ABSTRACT

A fiber reinforced structure having three sets of closely packed fiber bundles, the bundles extending in three planes disposed in essentially mutually perpendicular relation; the structure being manufactured by first forming at least one of the bundle sets into a plurality of frames, the fibers of which are bonded together to form fingers between which the remaining bundle sets are woven or wrapped.

5 Claims, 20 Drawing Figures

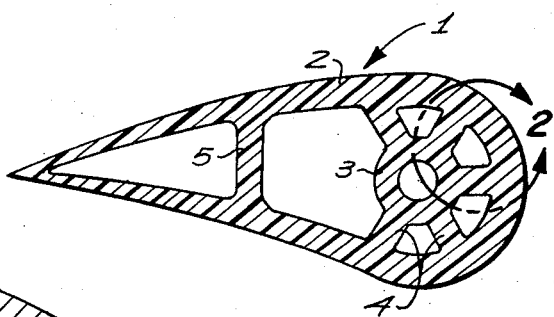
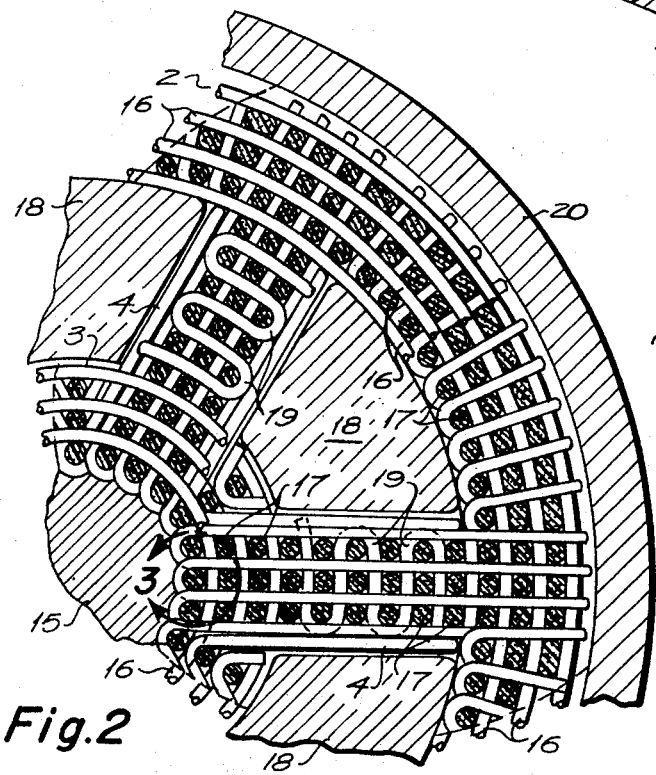
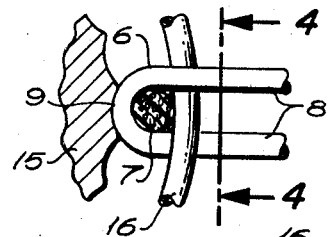
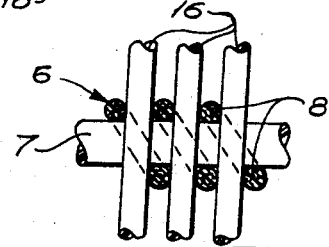
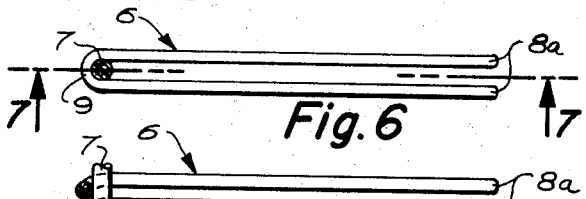
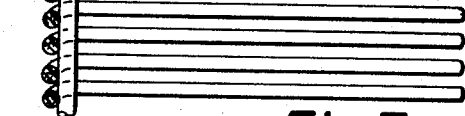
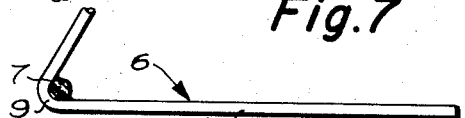
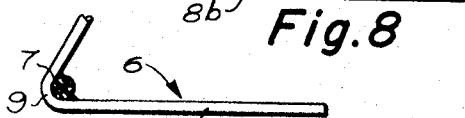
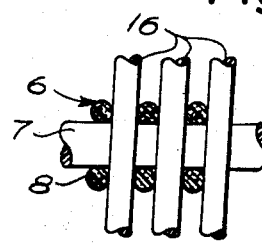
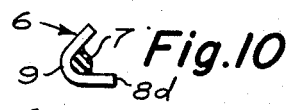

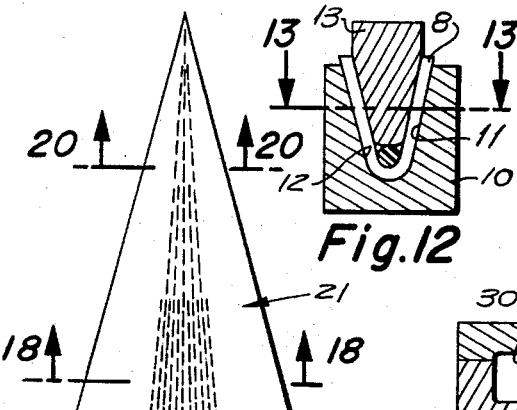
Fig.12
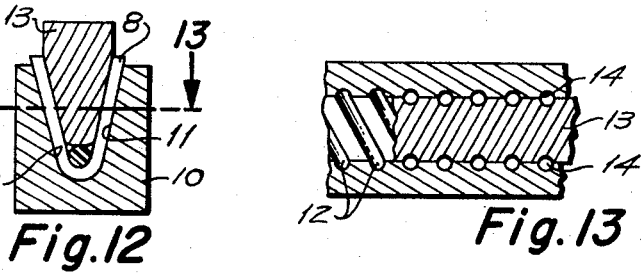
Fig.13
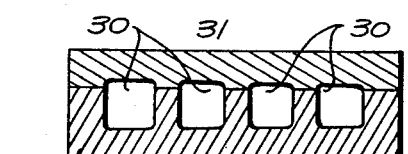
Fig.16
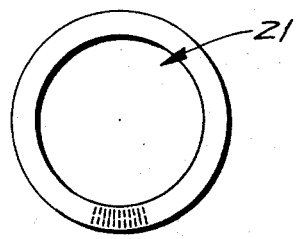
Fig.14
Fig.15
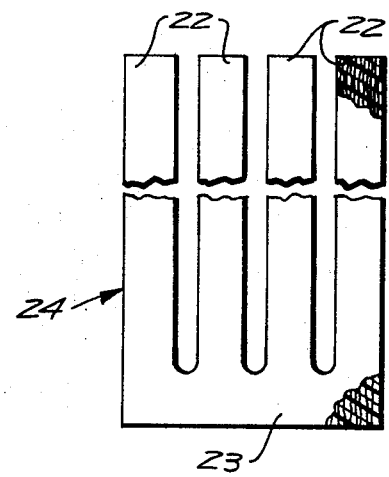
Fig.17
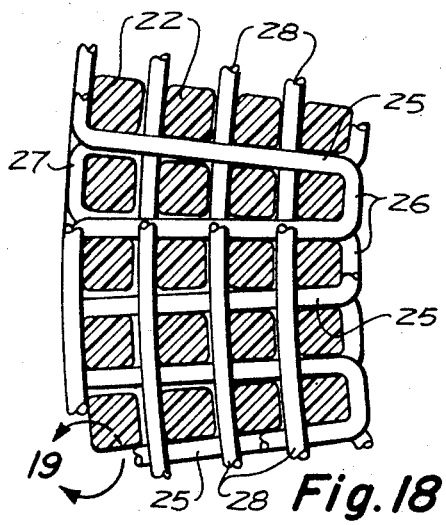
Fig.18
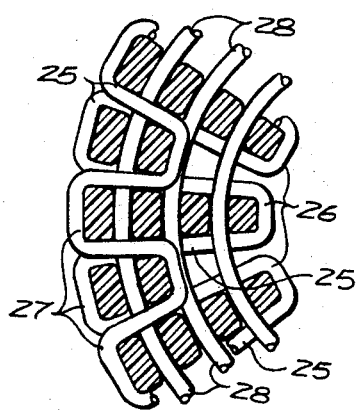
Fig.20
Fig.19

3,870,580

METHOD OF MANUFACTURING OF A FIBER REINFORCED STRUCTURE AND METHOD OF MANUFACTURE

This is a division of application Ser. No. 118,708, filed Feb. 25, 1971, now abandoned.

BACKGROUND OF THE INVENTION

Various structures have been formed of interwoven fibers; for example, fibers have been cross woven into sheets which have been stacked and impregnated with a bonding material such as plastic to form panels or wrapped to form cylinders or applied in a flexible state against a form to provide a contoured member. Also, fibers have been interwoven to form tubular members and bonded to form rigid tubes or flexible tubes such as hoses. Relatively rigid wire or rod members have been joined to form three dimensional structures over which various materials have been cast.

Often such structures use extremely fine fibers for the reason that such fibers whether they be metal, glass or various plastic material, have extremely high strength-to-weight ratio; however, full advantage of the inherently high strength-to-weight ratio of fine fibers is not realized in all directions within the structure.

SUMMARY OF THE INVENTION

The present invention is directed to a fiber reinforced structure and method of manufacture which is summarized in the following objects:

First, to provide a fiber reinforced structure and method of manufacture wherein the strength of the individual fibers is utilized to its greatest extent, and wherein the structure may take various forms, such that various structures which have heretofor been constructed of metal, for example, aircraft fuselages, wings and control surfaces, may be formed of fibers suitably bonded together with substantial reduction in weight, and often with reduction in cost.

Second, to provide a fiber reinforced structure and method of manufacture wherein the resulting structure may have relatively thick walls without excessive weight and wherein the walls may have excellent thermal or ablative properties.

Third, to provide a fiber reinforced structure and method of manufacture, as indicated in the preceding objects, wherein the resulting structure may be a single integrated member rather than a composite of individual members secured together by fastening devices.

Fourth, to provide a method of producing a fiber reinforced structure utilizing sets of dense fiber bundles, at least one set of which comprises a plurality of units or frames in which the fibers are joined by a resin and cured sufficiently to form a dimensionally stable substructure around or through which other sets of fiber bundles or strands may be applied, then bonded and cured to form the complete structure.

DESCRIPTION OF THE DRAWINGS

FIG. 1 is an essentially diagrammatical sectional view, showing a typical reinforced structure capable of manufacture by a method forming a part of this invention.

FIG. 2 is an enlarged sectional view, taken within circle 2 of FIG. 1, showing the assembled fiber bundles disposed within a mold prior to the pouring of a resin or the like to bond the fiber bundles together.

FIG. 3 is a further enlarged fragmentary sectional view, taken within circle 3 of FIG. 2.

FIG. 4 is a fragmentary sectional view, taken through 4—4 of FIG. 3.

FIG. 5 is a fragmentary sectional view, similar to FIG. 4, showing a modified arrangement of the fiber bundles.

FIG. 6 is a sectional view corresponding to the section plane of FIG. 2, showing one of the weaving frames.

FIG. 7 is a fragmentary sectional view thereof, taken through 7—7 of FIG. 6.

FIGS. 8, 9, 10 and 11 are sectional views, corresponding to FIG. 6, showing other weaving frames employed in the construction shown in FIG. 2.

FIG. 12 is a transverse sectional view of a typical mold for forming a weaving frame, the weaving frame being shown in position therein.

FIG. 13 is a sectional view, taken through 13—13 of FIG. 12, with the weaving frame omitted.

FIG. 14 is a substantially diagrammatical side view of a cone manufactured by the method forming a part of this application, some of the fiber reinforcing shown by broken lines.

FIG. 15 is an end view thereof, also with some of the fiber bundles indicated by broken lines.

FIG. 16 is a transverse sectional view of a mold employed to form the weaving frame employed in the construction shown in FIGS. 14 and 15.

FIG. 17 is a fragmentary side view of a weaving frame formed in the mold shown in FIG. 16.

FIG. 18 is an enlarged fragmentary sectional view, taken through 18—18 of FIG. 14, and showing a portion of a wall of the cone.

FIG. 19 is a further enlarged fragmentary sectional view, taken within circle 19 of FIG. 18.

FIG. 20 is a fragmentary sectional view, corresponding to FIG. 18, but taken through 20—20 of FIG. 14.

Reference is first directed to FIGS. 1 through 13. The construction here shown as representative of the fiber reinforced structure is intended to suggest an airfoil 1, having a peripheral portion 2, a tubular core 3 with radiating webs 4 extending between the core and the peripheral portion 2 and a cross web 5 extending between opposite sides of the peripheral portion.

Whatever shape or form the structure may take, it contains closely packed bundles of reinforcing fibers extending in essentially mutually perpendicular relation. The fibers may be glass fibers or high strength plastic fibers or metal fibers such as steel fibers, or a combination thereof.

In order to construct the fiber reinforced structure, sets of weaving frames 6 are formed which differ in size but are otherwise essentially the same. Each weaving frame comprises a connecting fiber bundle or strand 7, which becomes in the final structure a longitudinal fiber bundle and a plurality of folded fiber bundles 8, each forming in the final structure a pair of radiating fiber bundles joined by a loop 9. The loops 9 are wrapped partially about the connecting fiber bundles 7. The fiber bundles 7 and 8 are impregnated with a resin which is cured or partially cured to secure the fiber bundles in their respective positions to form a weaving frame 6.

The weaving frames may be constructed by use of a forming block 10, having a V-channel 11 bordered by grooves 12 which receive the folded fiber bundles 8.

The V-groove or channel receives a retainer bar 13, provided with grooves 14 to accommodate the folded fiber bundles 8, as shown in FIGS. 12 and 13.

The manner in which the weaving frames are used varies, depending upon the size and shape of the finished fiber reinforced structure. In the construction of the structure shown in FIGS. 1 and 2, several sets of weaving frames are preformed, as indicated in FIGS. 6 through 11. These differ in the length and angular relation of the folded fiber bundles. More specifically, the folded fiber bundles may be arranged in parallel and relatively long pairs, as indicated by 8a in FIGS. 6 and 7; or may be relatively long and in angular relation, as indicated by 8b in FIG. 8; or somewhat shorter, as indicated by 8c in FIG. 9; or still shorter, as represented by 8d and 8e in FIGS. 10 and 11, respectively.

Utilizing the portion of the fiber reinforced structure shown in FIG. 2 as an example, selected weaving frames 6, such as those having strands 8a and 8b, are placed about a central core 15 and held there by a series of circumscribing strands 16. Other longitudinal strands 17 are added alternately with the circumscribing strands 16 and at appropriate places other weaving frames are set in position. In order to form the radiating webs 4, planetary cores 18 are set in place and between the planetary cores, multiple folded fiber bundles 19 are used in place of the circumscribing strands 16. The assembled structure is then encased in a peripheral mold 20 and the spaces filled with a resin; preferably a vacuum is applied to the mold spaces to permit the resin to impregnate the fiber bundles as well as to assure complete filling of all space between the fiber bundles. If desired, the fiber bundles may be impregnated with a resin prior to being assembled, and may in some instances, be cured or partially cured prior to assembly and the adding of a resin to the mold cavities.

Reference is now directed to FIGS. 14 through 20. For purposes of illustration, a cone structure 21 is suggested; however, it is contemplated that many other shapes may be accommodated to this embodiment of the invention. This construction and its method of manufacture utilizes longitudinal fiber bundles or strands 22. Sets of the fiber bundles are joined at one end by cross members 23 so as to provide a plurality of weaving frames 24. The fiber bundles of each weaving frame may in the final structure be disposed in radial relation, as shown in FIGS. 18 and 20 so as to receive radial fiber bundles 25, wrapped back and forth, forming loop portions 26 and 27 at the radially inner and radially outer ends of each waving frame. Also, the longitudinal fiber bundles 22 may receive therebetween circumferential fiber bundles 28 which may be wrapped helically between the radial fiber bundles 25.

The weaving frames 24 may be constructed by use of a molding block 29, having longitudinal channels 30. To complete the mold, the molding block 29 may receive a cover 31, as indicated in FIG. 16.

As indicated in FIGS. 18 and 20, the longitudinal fiber bundles 22 may be relatively large as compared to the radial and circumferential bundles 25 and 28, and may be essentially rectangular or square in cross section. If the structure being formed has a relatively large radius, as compared to the wall thickness, each weaving frame 24 may occupy the entire wall, as indicated in FIG. 18. If the radius is smaller, as indicated in FIG. 20, then some of the weaving frames 24 may have less width than the others and fewer longitudinal fiber bundles, and may have a greater radial taper.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. The method of making a high strength fiber reinforced structure, comprising the steps of:
arranging a plurality of bundles, of reinforcing fibers, in spaced, generally parallel relation and in a pattern defining a plurality of channels between said bundles with a first set of parallel channels transversely intersecting a second set of parallel channels;
securing said bundles, at one end thereof, in said described spaced relation and rendering each bundle sufficiently rigid to be self-supporting;
substantially filling said sets of channels with additional bundles of reinforcing fibers arranged in layers with the bundles of adjacent layers extending alternately along said first and second sets of channels; and
encasing all said fibers in an initially fluid bonding agent, then solidifying said agent to form said structure.

2. The method defined in claim 1 wherein said step of securing said bundles comprises:
attaching a plurality of said bundles to an elongated bundles of fibers, in spaced parallel relation therealong to define a frame; and
arranging and holding a plurality of said frames in spaded, generally parallel relation.

3. The method defined in claim 2 wherein said step of attaching each of said bundles comprises bending a bundle of fibers to generally U-shape, embracing said elongated bundle within the bight of said U-shape, and bonding said bundles together.

4. The method defined in claim 2 wherein said step of rendering said bundles self-supporting comprises the further step of impregnating said bundles with a settable binder and at least partially curing said binder to a substantially rigid state.

5. The method defined in claim 1 wherein said step of securing said bundles includes the step of arranging said bundles around a core member, and removing said core member after said bonding agent is solidified whereby said structure is provided with an opening therein.

* * * * *